United States Patent [19]
Mitchell

[11] 3,710,661
[45] Jan. 16, 1973

[54] VIBRATION DAMPENER

[75] Inventor: Wallace F. Mitchell, Arlington Heights, Ill.

[73] Assignee: Ammco Tools, Inc., North Chicago, Ill.

[22] Filed: May 3, 1971

[21] Appl. No.: 139,394

[52] U.S. Cl. ..................82/38 A, 82/2 A, 82/4 A, 82/DIG. 19
[51] Int. Cl. .............................................B23b 25/00
[58] Field of Search ..82/38, 38 A, 4 A, 2 A, DIG. 19

[56] References Cited

UNITED STATES PATENTS

| 3,591,987 | 7/1971 | Porath | 82/38 R |
| 3,535,963 | 10/1970 | Dietl | 82/38 R |
| 3,377,752 | 4/1968 | Border, Jr. | 82/38 R X |
| 2,745,445 | 5/1956 | Klawitter | 82/2 A |
| 2,734,255 | 2/1956 | Tack | 82/4 A |
| 2,252,804 | 8/1941 | Gass | 82/4 A |

Primary Examiner—Harrison L. Hinson
Attorney—Fidler, Patnaude & Lazo

[57] ABSTRACT

A device for dampening vibrations in a rotating disc during a machining operation on the faces thereof employs a pair of blocks having friction surfaces pressed against the faces of the disc so as to be pressed tightly against the tool pieces by the rotating disc.

5 Claims, 3 Drawing Figures

PATENTED JAN 16 1973

3,710,661

INVENTOR
WALLACE F. MITCHELL
BY
Fidler, Patnaude & Lago

ATTORNEYS

VIBRATION DAMPENER

The present invention generally relates to vibration dampeners, and it relates more particularly to a new and improved method and means for reducing vibrations in a rotating disc during a metal removal operation thereon.

Disc brakes as used on automotive vehicles employ relatively large diameter, thin discs against the faces of which friction elements are pressed to retard rotation of the discs and the wheels to which they are attached. For proper operation of the brakes the faces of the discs must be flat, smooth and parallel. Such faces are formed by a metal removal operation and any vibration of the disc during this operation causes non-planar and non-parallel faces which results in irregular braking in the associated vehicle. The vibration problem becomes particularly acute after several resurfacing operations since the disc is then substantially thinner and more subject to vibration.

Various different types of dampeners have been provided in the prior art. One type is placed directly on one face of the disc while the other face is being machined. While this type of dampener performs satisfactorily, it cannot be used when both faces are machined simultaneously. Another type of dampener fits over the periphery of the disc. It also performs satisfactorily but cannot be used with the relatively thin discs now in widespread use.

Therefore, a principal object of the present invention is to provide a new and improved device for dampening vibrations in a workpiece during a metal removal operation thereon.

Another object of this invention is to provide a new and improved device for dampening out vibrations in a disc during a metal removal operation.

A further object of this invention is to provide a new and improved device for dampening out vibrations during machining of the opposite faces of a thin disc.

Briefly, the above and further objects may be realized in accordance with the teachings of the present invention by biasing a pair of rigid blocks against the faces of the disc so that the friction between the disc and the blocks forces the blocks firmly against the tool pieces in proximity to the cutting edges thereof.

Further objects and advantages and a better understanding of the present invention may be had by reference to the following detailed description taken in connection with the accompanying drawing in which.

Figure 1:
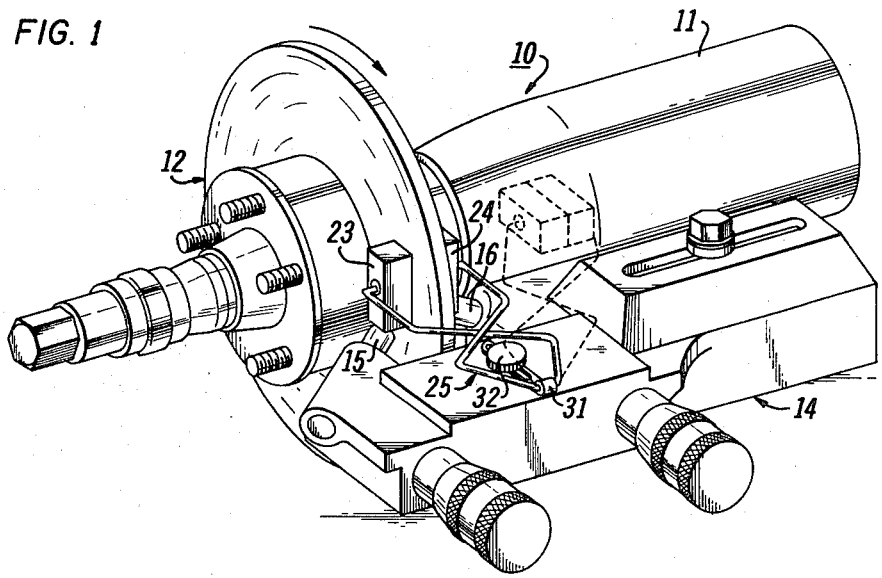
FIG. 1 is a perspective view of a portion of a disc grinding lathe embodying the present invention.

Referring now to the drawings and particularly to FIG. 1 thereof, there is shown a portion of a lathe 10 including a main housing 11 enclosing a drive mechanism for rotating an arbor on which a brake disc 12 is mounted. A tool holder assembly 14 is suitably mounted on a cross-feed mechanism, not shown, and adjustably supports a pair of axially adjustable tool pieces. The tool pieces comprise a pair of tool holders 15 and 16 and a pair of tool bits 17 and 18 tightly secured to the ends of the tool holders 15 and 16 for disposition against the faces 19 and 20 of the disc 12 during machining thereof. During operation of the lathe 10, the tool holder assembly 14 moves in a direction perpendicular to the arbor in synchronism with the rotation of the workpiece, and as the tool bits 17 and 18 move across the faces 19 and 20 of the disc 12, a cut is made and vibrational waves are established in the disc. It has been found that flat, parallel faces cannot be so machined unless the vibrational waves in the disc are substantially inhibited or attenuated.

In accordance with the present invention such vibrational waves are substantially eliminated by means of a pair of vibration dampening members 23 and 24 mounted in proximity to the tool pieces and spring biased against the faces 19 and 20 of the disc 12. As illustrated in FIG. 1 the disc moves downwardly against the tool pieces and, therefore, the members 23 and 24 are positioned above the tool pieces so as to be forced by the disc 12 directly against the tool pieces thereby to suppress vibration of the tool pieces and of the disc.

Considered in greater detail, the dampening members 23 and 24 are solid blocks of a plastic which will not scratch or score the steel surface of the disc 12 and are biased against the opposite faces 19 and 20 of the disc by means of a spring 25. The blocks may, if desired, be made of metal and provided with a plastic disc engaging surface. The spring 25 is a unitary piece of spring metal formed in the general shape of a figure eight and having aligned inturned ends 26 and 27 respectively secured to the members 23 and 24 by a pair of rubber-like grommets 28 and 29 compressed in suitable recesses in the members 23 and 24. The spring 25 is mounted for free pivotal movement by a bracket 31 which is slidably mounted on the tool holder assembly 14 for adjustable movement in a direction perpendicular to the arbor of the lathe. The bracket 31 should be adjusted so that the blocks 23 and 24 are disposed directly above the tool bit holders 15 and 16, and a screw 32 is provided for holding the bracket 31 in the adjusted position. The spring 25 may be pivoted upwardly into the dotted line position as shown in FIG. 1 wherein the blocks 23 and 24 are out of engagement with the disc 12 while the tool holders 15 and 16 are adjusted to provide the desired cut. After the tool holders 15 and 16 have been thus adjusted, the spring 25 may be pivoted downwardly into the solid line position illustrated in FIG. 1 wherein the blocks 23 and 24 are spring biased against the faces 19 and 20 of the disc directly above the tool pieces. The blocks 23 and 24 have friction faces 33 and 34 so that as the disc 12 rotates the friction between the blocks 23 and 24 and the disc faces 19 and 20 moves the blocks 23 and 24 downwardly into tight forceable engagement with the tool pieces.

Figure 2:
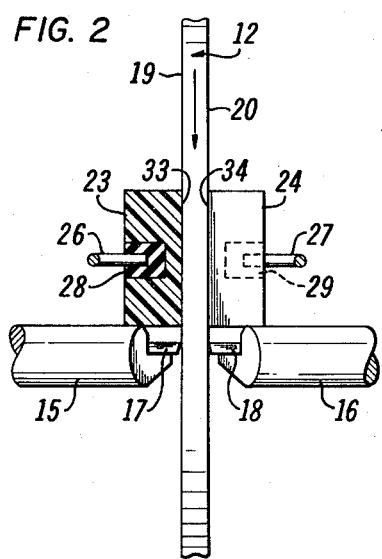
FIG. 2 is a partially sectioned view showing the manner in which the vibration dampening members directly engage the tool holders in one embodiment of the present invention.
Figure 3:
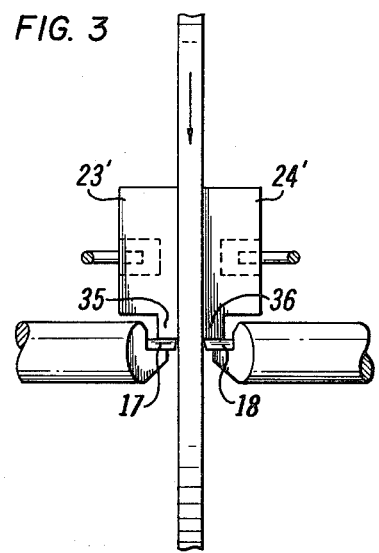
FIG. 3 is a view similar to FIG. 2 of another embodiment of the invention wherein the vibration dampening members directly engage tool bits carried by the tool holders.

In the embodiment illustrated in FIG. 2 the blocks 23 and 24 engage the tool holders 15 and 16 in the vicinity of the outer edges thereof. In FIG. 3 there is illustrated a different embodiment of the invention wherein blocks 23' and 24' have depending portions 35 and 36 which directly engage the tool bits 17 and 18.

It may thus be seen that with the vibration dampener of the present invention the vibration dampening members 23 and 24 are held by spring pressure against the disc 12 and are held by the rotating disc against the tool pieces in close proximity to the location where such tool pieces engage the faces 19 and 20 of the disc. In this manner vibration of the tool pieces themselves are minimized and vibration of the disc 12 is suppressed at its place of origin.

While the present invention has been described in connection with particular embodiments thereof, it will be understood that those skilled in the art may make many changes and modifications without departing from the true spirit and scope thereof. Accordingly, the appended claims are intended to cover all such changes and modifications as fall within the true spirit and scope of the present invention.

What is claimed is:

1. Apparatus for dampening vibration of a rotating disc during machining of the faces thereof by a pair of tool pieces respectively engaging said faces, comprising
    a pair of pressure pads,
    means mounting said pads against said faces in engagement with said tool pieces in proximity to the points of engagement between said tool pieces and said faces, and
    means urging said pads against said faces, whereby said pads are held tightly against said disc and against said tool pieces.

2. Apparatus for dampening vibration as set forth in claim 1 wherein
    said means mounting said pads permits relative movement between said pads and said tool pieces, and
    said pads each have a friction disc engaging surface and are disposed on the sides of said tool pieces so as to be urged by said disc against said tool pieces.

3. Apparatus for dampening vibration as set forth in claim 2 wherein
    said means for urging is a spring means.

4. Apparatus for dampening vibrations as set forth in claim 3 further comprising
    means pivotally mounting said spring means for movement parallel to the faces of said disc.

5. Apparatus for dampening vibrations as set forth in claim 2 wherein
    said tool pieces comprise a pair of tool bits respectively mounted on a pair of tool holders, and
    said pads are urged by said disc into direct engagement with said tool bits.

* * * * *